United States Patent

Williams et al.

[11] Patent Number: 5,860,321
[45] Date of Patent: Jan. 19, 1999

[54] POWER TRANSMISSION UTILIZING CONVERSION OF INERTIAL FORCES

[76] Inventors: Eugene A. Williams, 5309 Plymouth St., Boise, Id. 83706; John W. Williams, 1701 Winslow Rd., Bloomington, Ind. 47401

[21] Appl. No.: 404,346

[22] Filed: Mar. 15, 1995

[51] Int. Cl.[6] .............................. F16H 27/02; F16H 31/00
[52] U.S. Cl. .................................................. 74/143; 74/61
[58] Field of Search ........................... 74/61, 143, 810.1, 74/112, 142, 141.5; 476/48

[56] References Cited

U.S. PATENT DOCUMENTS

| | | |
|---|---|---|
| 1,018,972 | 2/1912 | Herman .................................. 74/810.1 |
| 1,896,732 | 2/1933 | Stone . |
| 2,091,080 | 8/1937 | Mursch ........................................ 74/61 |
| 2,227,867 | 1/1941 | Steinhaus ..................................... 74/61 |
| 2,293,962 | 8/1942 | Baily ........................................... 74/61 |
| 2,839,937 | 6/1958 | Calfee . |
| 3,261,219 | 7/1966 | Kraus ......................................... 476/48 |
| 3,360,924 | 1/1968 | Davis . |
| 3,555,915 | 1/1971 | Young . |
| 3,810,394 | 5/1974 | Novak . |
| 4,121,472 | 10/1978 | Vural et al. . |
| 4,128,020 | 12/1978 | Gray . |
| 4,501,169 | 2/1985 | Stilin ................................... 74/810.1 X |
| 4,503,724 | 3/1985 | Ward ......................................... 74/143 |
| 4,597,463 | 7/1986 | Barnard . |
| 5,136,888 | 8/1992 | Nix ....................................... 74/143 X |

FOREIGN PATENT DOCUMENTS

| | | | |
|---|---|---|---|
| 607040 | 3/1926 | France ....................................... 74/61 |
| 4219648 | 1/1993 | Germany ................................... 74/61 |

*Primary Examiner*—Charles A. Marmor
*Assistant Examiner*—Troy Grabow
*Attorney, Agent, or Firm*—Stanley N. Protigal

[57] ABSTRACT

A machine translates torque applied to the input shaft at an input speed (RPM), first into kinetic energy, and finally to torque on an output shaft. The input power is first converted to kinetic energy by accelerating a mass or masses, so that the reaction force to this acceleration is an oscillating bi-directional torque or force. This torque or force is then converted to a unidirectional torque applied to an output shaft. This arrangement provides a continually variable automatic transmission, or torque converter in which output shaft speed is proportional to the input shaft speed and inversely proportional to the load applied, and in which transmitted torque corresponds to the input shaft speed.

9 Claims, 7 Drawing Sheets

POWER TRANSMISSION UTILIZING CONVERSION OF INERTIAL FORCES

FIELD OF THE INVENTION

This invention relates generally to power transmissions in which input power having one set of force characteristics with respect to power is converted to an output having another set of force characteristics with respect to power. More specifically, it relates to conversion of power at an input, which is preferably rotational, to power at an output, which is preferably also rotational, but having different speed and force characteristics from the input.

BACKGROUND OF THE INVENTION

Mechanical energy can generally be resolved into components of force and velocity. In the case of rotational force, these are in the form of rotational velocity (RPM) and torque. Power transmissions typically convert energy from one speed or range of angular velocities and range of torque to output energy at a different range of angular velocities. Conservation of energy dictates that the input speed and torque resolve to the same energy as the output energy, minus energy conversion losses.

Such energy conversion losses usually result from the attempt of the power transmission to accommodate a wide range of angular velocities while still converting the energy efficiently. Normally an operational speed output range is accommodated, along with a low speed for a startup or stall. If lower than normal operational speed or stall speed output is accommodated along with a significantly high input speed, the efficiency is compromised. Accommodations of this discrepancy are well-known when associated with land vehicle transmissions.

In a fluid clutch transmission, high stall speeds permit maximum initial torque output, but compromise overall efficiency. This type of device does a poor job of matching the output load to the prime mover over a wide range of input speeds.

Mechanical clutch transmissions, on the other hand, rely on slippage in order to accommodate low velocity starts from stall velocity. Maximum torque output at stall results in excessive clutch wear. While tolerable in racing applications, this is not acceptable where routine operation requires longevity of operating components. Again, there are no provisions to match the output load to the input power.

Continuously variable speed drives are capable of small variations in input to output speed ratios, but also have difficulty in handling stall velocities. In addition, wear characteristics of variable speed drives are often unacceptable. Power capabilities and efficiencies are usually low.

It is not necessarily desirable that input speed be maintained at a constant rate, even in the case of continuously variable speed drives. In many prime movers, the input speed increases proportionally to output power, but only within a narrow range as compared with output speed. This is typically the case with Otto cycle internal combustion engines, diesel engines, and human power as applied to a bicycle. Narrower speed ranges are common to some electric motors and gas turbine engines. Accordingly, it is desired to have a power transmission which accommodates a wide variety of output angular velocities but does not excessively restrict variation in input angular velocities.

In the case of a power transmission used on a bicycle, if a relaxed cadence is applied, the input force should not be excessively high. If a sprint cadence if applied, the rider may prefer that this force be slightly different. In this manner the cyclist is able to sustain high power output resulting from a fast cadence. In an ordinary gear change transmission (a derailleur and sprocket arrangement on the bicycle), the rider selects a gear which accommodates the desired range of force and cadence.

Stall speed is normally not a problem on a bicycle, but at slow speeds encountered on steep hills, it is desired that a transmission quickly adjust to the ideal ratio of cadence to wheel speed. This is difficult with standard hub type or derailleur type gear change transmissions because, during the gear change, the load must be interrupted or reduced and because the gear changing operation occurs relatively slowly.

An additional disadvantage of gear change transmissions is that the operator must have an understanding of the relative speeds of input power and output power. In some cases, and for some people, this comes naturally, but in other cases, this determination can be tasking.

If a motor is substituted, the motor must be able to run at idle, and with application of power be able to speed up to near its maximum output speed with the transmission's output speed at stall. Input speed should then be able to vary along a desired range in proportion to output power, in order to maintain a desired input speed at each power setting.

In the case of electric motors, low speed operation may create stress on the motor. In some applications, such as compressors or pumps which are re-started with a significant output pressure head, the load on the motor may prove to be excessive. Typical applications where this is a problem are air conditioner compressors, where delay start or thermal shutoff circuits are used to protect the motor. Ideally, the motor should have an ability to re-start with a minimum load so that the motor can accelerate to an ideal operating speed.

It is therefore desired to provide a power transmission which is adaptable to a wide variety of output speed conditions, and which accepts input speed and power and be able to generally track an ideal power curve for the input power source or prime mover.

It is further desired to provide a power transmission which has good output stall characteristics in that input speed may be maintained during output stall without undue wear on the transmission and without significantly impeding output efficiency. Ideally, power consumption of the prime mover during output stall conditions should be minimized in order to reduce loads on the prime mover and in order to permit the prime mover to deliver a high output power when the output is accelerating at near stall speeds.

It is desired that the power transmission be able to provide an output speed which ranges from stall to a maximum speed which can be anticipated given the power consumption of the output device and practical limitations. The ratio of input speed and power should closely approximate the capabilities of the input device or prime mover, except at stall, where low power consumption at idle should be accommodated. Ideally, power losses in the transmission should be minimal, so that maximum output power and maximum power efficiency be achieved.

SUMMARY OF THE INVENTION

The invention relates to a continuously variable automatic transmission, wherein the power from the input shaft is converted into kinetic energy. The velocity of the mass or masses containing this kinetic energy is then varied, either in magnitude or direction. The resulting oscillating force is applied as an oscillating torque. This oscillating bi-directional torque is then converted to a unidirectional torque and applied to the output shaft.

In accordance with the invention, the transmission converts input power into kinetic energy to maintain the momentum of rotating or oscillating mass. The developed torque only removes energy from the system when the said torque does work.

The invention provides a continuously variable power transmission which first converts input power to kinetic energy and then converts the reaction force to a unidirectional output. A drive mechanism receives the input power and reciprocally drives at least one rotating mass. The reciprocation of the rotating mass is then transferred to a reciprocating output drive. A force translation mechanism is connected to the reciprocating output drive. The reaction force is then converted to a unidirectional force output. Thus, a reciprocal drive mechanism is driven by an input power drive mechanism and reaction force is rectified to provide a unidirectional force output by a force rectification mechanism.

In one configuration, the power from the input shaft is coupled to the output shaft by means of a rocker arm with kinetic elements on each end. Alternatively, the rocker arm can also be a rotatable disk or plate. The kinetic elements can be accelerated either linearly or angularly.

In the preferred embodiments, a plurality of kinetic elements are positioned at the ends of the rocker arm or around the periphery of the rotatable plate. These kinetic elements consist of rotating out-of-balance masses. Power from the input shaft is coupled to the kinetic elements by a suitable means. Typically this can include gears, belts, chains, or direct connection to a motor.

Since the rotating out-of-balance kinetic elements are constantly changing velocity (they are traveling in a circular path, and therefore their direction of travel is constantly changing), their kinetic energy is constantly changing. The reaction to this change in kinetic energy is a force (centrifugal force) acting radially through each kinetic element.

The arrangement of the kinetic elements is such that a portion of this centrifugal force acts to produce a torque on the rocker arm as they rotate. With a plurality of kinetic elements in the appropriate phase relationship, some components of the centrifugal forces produce a bi-directional torque around the axis. The remaining components of the centrifugal forces are in opposite directions and of equal magnitude. Hence, they balance and do not produce vibration with respect to the axis.

The kinetic elements rotate synchronously, but out of phase by the number of degrees which permits the kinetic elements to counterbalance each other. For example, on a rocker arm with a kinetic element on each end, the kinetic elements would be 180° out of phase. For four kinetic elements equally spaced around the periphery of a disk, each would be 90° out of phase with the adjacent element.

The peak torque produced by the kinetic elements is proportional to the mass of said elements, the square of velocity of said elements, and is proportional to the radius of rotation of said elements and proportional to the radius of the rocker arm.

The oscillating rotation of the rocker arm is converted to unidirectional rotation on the output shaft by way of one-way clutches in the case of mechanical movement. Other types of output rectifiers are possible. Such alternative rectifiers would include check valves, which would be useful if a hydraulic output is desired to drive a hydraulic motor, or a synchronous crank.

In this configuration, output torque when the output is at stall speed (zero RPM) will be:

$$\tau = M * r * \omega^2 * \text{SIN}(\alpha) * R * n,$$

where:

$\tau$=torque

M=mass of kinetic elements r=radius to the center of mass of the kinetic element $\omega$=angular velocity of kinetic element $\alpha$=angle of kinetic element R=radius of rocker arm n=number of kinetic elements As the angular velocity of the output shaft approaches the maximum angular velocity of the rocker arm, the torque modulated onto the output shaft approaches zero.

In one embodiment, the vehicle for the kinetic energy is a pair of rotating kinetic elements on a rocker arm. The kinetic elements are driven by a rotary input along a substantially parallel axis. The rotating kinetic elements rotate in the same direction and are aligned so that their sum centrifugal force along one axis is zero. The centrifugal forces of the rotating kinetic elements normal to that axis causes the rocker arm to oscillate in reaction to the centrifugal forces. The rocker arm drives a pair of one-way clutches which are configured to drive an output shaft in response to the movement of the rocker arm so that the output shaft rotates in a single direction of rotation. The torque times the speed of the rotary input should equal the torque times the speed of the output shaft (minus mechanical losses).

If the output speed is maintained at zero, the movement of the rocker arm is zero, and so power consumption is also near zero. There is little frictional loss, and so idle power consumption is reduced. Since the load on a prime mover is closely related to output power, load on the prime mover at idle is low. This permits idle, while allowing efficient transfer of power at low output speeds.

DETAILED DESCRIPTION OF THE PREFERRED EMBODIMENTS

Figure 1:
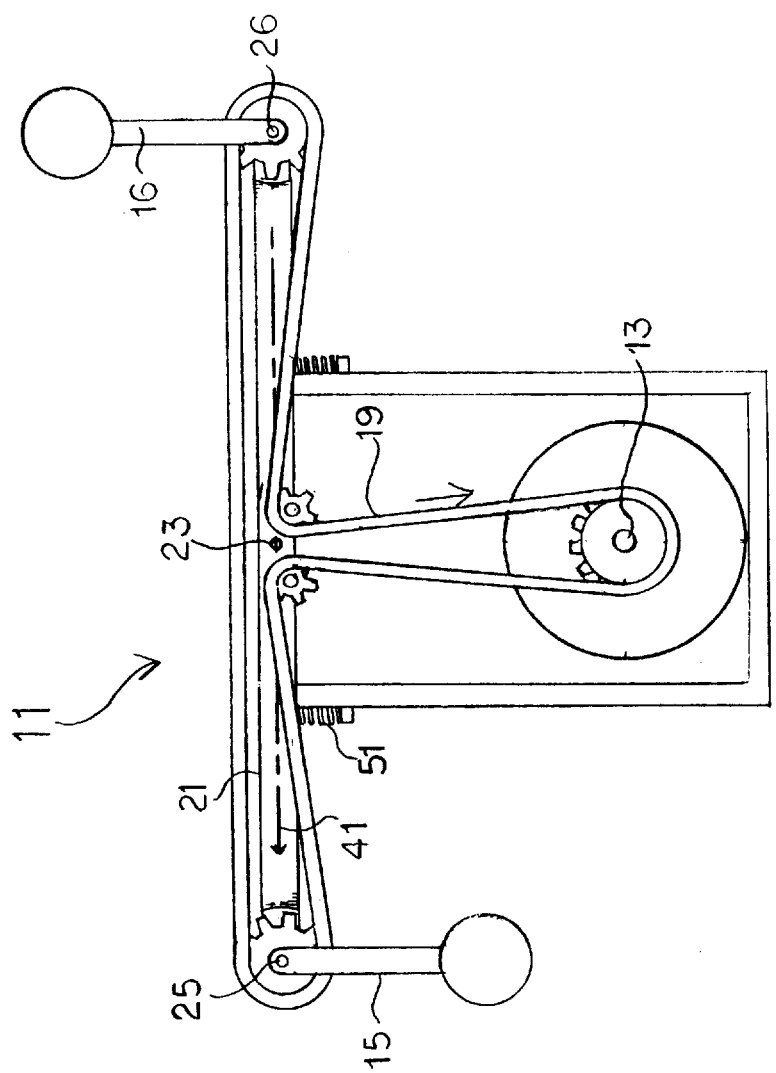
FIG. 1 shows an embodiment of the inventive transmission in which a chain drive is used to transfer input power to a pair of rotating masses.
Figure 2:
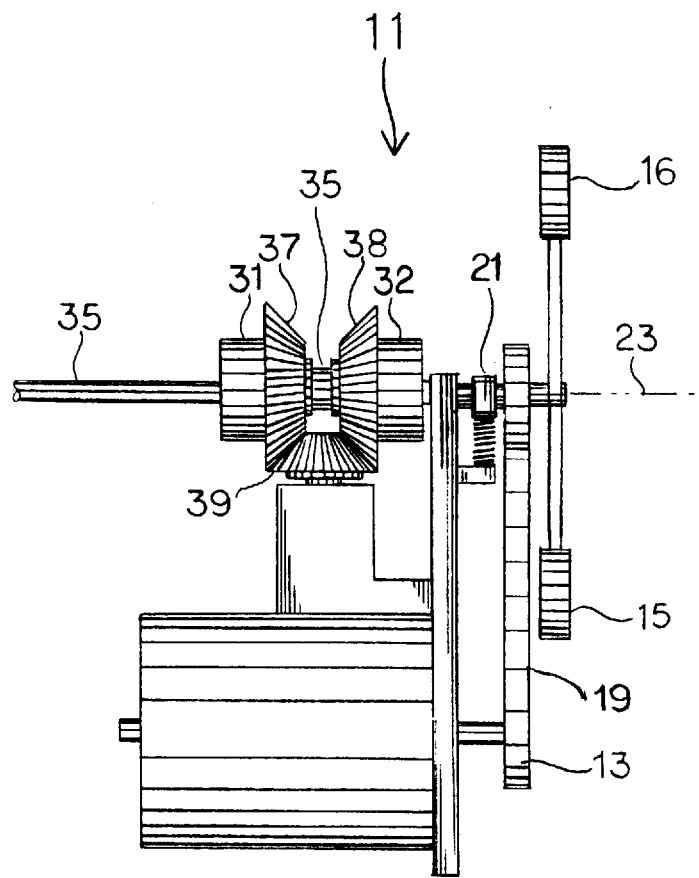
FIG. 2 shows a drive arrangement for the transmission of FIG. 1.

FIGS. 1 and 2 show a power transmission unit 11 according to one preferred embodiment of the invention. An input drive shaft 13 is connected to a pair of rotating kinetic elements 15, 16 by means of a belt (not shown) or a chain drive 19. The rotating kinetic elements 15, 16 are rotatably mounted on opposite ends of a rocker arm 21, which is arranged to pivot about a center axis 23. The rotating kinetic elements 15, 16 rotate about respective axes 25, 26 on the rocker arm 21 where the rotating kinetic elements 15, 16 are mounted. The respective axes 25, 26 are fixed with respect to the rocker arm 21, and therefore move with the rocker arm 21 about the center axis 23 of the rocker arm 21. The rocker arm 21 thereby functions as a lever in that force transverse to the length of the rocker arm 21 is translated as a torque about its center axis 23.

As shown in FIG. 2, a pair of one-way clutches 31, 32 connect the rocker arm 21, along the center axis 23, to an output shaft 35. One-way clutches are unidirectional drive mechanisms which transmit torque in one direction of rotation and allow free movement in the opposite direction of rotation. These mechanisms are commonly found on the rear hubs of bicycles, and transmit torque from the bicycle's driven sprocket to the wheel, but permit coasting when the wheel is turning faster than the required drive speed of the sprocket. They typically operate by pawls depressed by light springs or by a wedging action of rollers. One-way clutches are sometimes referred to as, "overrun clutches."

The one-way clutches 31, 32 engage the output shaft 35, by means of gears 37, 38, 39 in opposite rotational directions. The gears 37, 38, 39 rotate the output shaft 35 in opposite rotational directions, so that opposite directions of pivot of the rocker arm 21 about the center axis 23 drive the output shaft 35 in one direction of rotation. While the output shaft 35 is shown as concentric with the one-way clutches 31, 32, any convenient configuration may be used, provided that the output is in the desired direction.

Referring again to FIG. 1, a pivoting line of motion 41 is defined by a line passing through the center axes 25, 26 of the rotating kinetic elements 15, 16. Since the center axes 25, 26 move with the rocker arm 21, the pivoting line of motion 41 also moves with the rocker arm 21 about the center axis 23 of the rocker arm 21.

The rotating kinetic elements 15, 16 are arranged to rotate in same direction and are 180° out of phase with each other. As a result, the rotation of the rotating kinetic elements 15, 16 results in a sum of the centrifugal forces along the pivoting line of motion 41. This sum, parallel to the pivoting line of motion 41, is equal to zero. In actual practice, the position of the zero sum centrifugal force shifts slightly because of the effects of friction and rotational acceleration of the rotating masses in the form of kinetic elements 15, 16. This shift in position must be compensated for, as will be seen.

The input drive shaft 13 and the center axis 23 of the rocker arm may be coaxially aligned. It is also possible to arrange the input drive shaft 13 and the center axis 23 so that they are not coaxial, but nearly so. In this manner, the coaxial elements remain substantially coaxial. It is of course also possible to arrange the input drive shaft 13 and the center axis 23 so that they are not coaxial.

Referring to both FIGS. 1 and 2, the out of phase arrangement of the rotating kinetic elements 15, 16 is such that the centrifugal force normal to the pivoting line of motion 41 is additive. This cumulative force is in opposite directions, so that the force manifests itself as a torque on the rocker arm 21 about the center axis 23 of the rocker arm. The one-way clutches 31, 32 translate this torque to a drive torque on the output shaft 35. Because of the arrangement of the one-way clutches 31, 32 and gears 37, 38, 39, the drive torque on the output shaft 35 is a unidirectional torque.

The centrifugal force of the kinetic elements 15, 16 counterbalance each other in the axis parallel to the pivoting line of motion 41, but cause the rocker arm 21 to oscillate. If there is no load on the output shaft 35, then the centers of the kinetic elements 15, 16 trace ellipses. This is a result of the rocker arm oscillation. As the load on the output shaft 35 increases, the traced paths of the kinetic elements 15, 16 become more circular, as the center axes 25, 26 of the rotating kinetic elements 15, 16 oscillate less.

Since movement of the rocker arm 21 is inversely related to the force resisting movement of the output shaft 35, the speed of the output shaft 35 is automatically adjusted to match the available input power. If the output shaft 35 increases in speed, the rocker arm 21 pivots more in response to the centrifugal force of the rotating kinetic elements 15, 16, until the output shaft 35 is released to a no-load condition. In this circumstance, the input drive shaft 13 is essentially freewheeling.

The torque exerted on the output shaft 35 at stall is:

$$\tau = M * r * \omega^2 * \text{SIN}(\alpha) * R * n,$$

where:

$\tau$ = torque

M = mass of kinetic elements (rotating kinetic elements 15, 16)

r = radius to the center of mass of the kinetic element $\omega$ = angular velocity of kinetic elements (rotating kinetic elements 15, 16)

$\alpha$ = angle of kinetic elements (rotating kinetic elements 15, 16)

R = radius of rocker arm (rocker arm 21)

n = number of kinetic elements (rotating kinetic elements 15, 16)

The power consumption of the power transmission at stall is near zero until an output speed is developed. The power consumption of the prime mover (driving the input shaft 13) would be equal to the frictional losses in the bearings and/or gears driving the rotating kinetic elements 15, 16 at a speed corresponding to a particular input speed.

As a result of friction and a reaction to the torque required to maintain the kinetic energy in the kinetic elements 15, 16, there is a tendency of the rocker arm 21 to rotate about center axis 23 of the rocker arm 21. In order to maintain the pivoting line of motion 41 in a generally stable position, a retention spring 51 is provided. The force exerted by retention spring 51 is relatively low, as compared to the torque produced by the rotating kinetic elements 15, 16, but is sufficient to return the average position of the pivoting line of motion 41 to a neutral position without substantially inhibiting movement of the rocker arm 21 in response to the centrifugal force of the rotating kinetic elements 15, 16.

Multiple power transmission units such as power transmission unit 11 shown in FIGS. 1 and 2 may be provided. This reduces the required force load on any one component by dividing the output power between the power transmission units 11. In addition, if such multiple power transmission units 11 are aligned equally out of phase, the load on a prime mover is smoothed and the output torque is smoothed. In the same manner as alternating current electrical machinery is made to operate more efficiently with a smoother power transfer, three power transmission units 11 having rocker arms out of phase by 120 apart are believed to have a smooth power draw and provide a smooth power output. The extent to which multiple power transmission units 11 would provide optimum power smoothing depends on the extent to which actual power consumption or output follows a sinusoidal wave pattern.

It is also possible to provide the clutches as selectively engagable one-way clutches. This would provide an ability to reverse the drive direction. One set of one-way clutches would be engaged to drive the output shaft 35 in one direction, as described above. Another set of one-way clutches would drive the output shaft 35 in an opposite direction when a reverse direction is desired of the output shaft 35. This would appear as shown in FIGS. 1 and 2.

Figure 3:
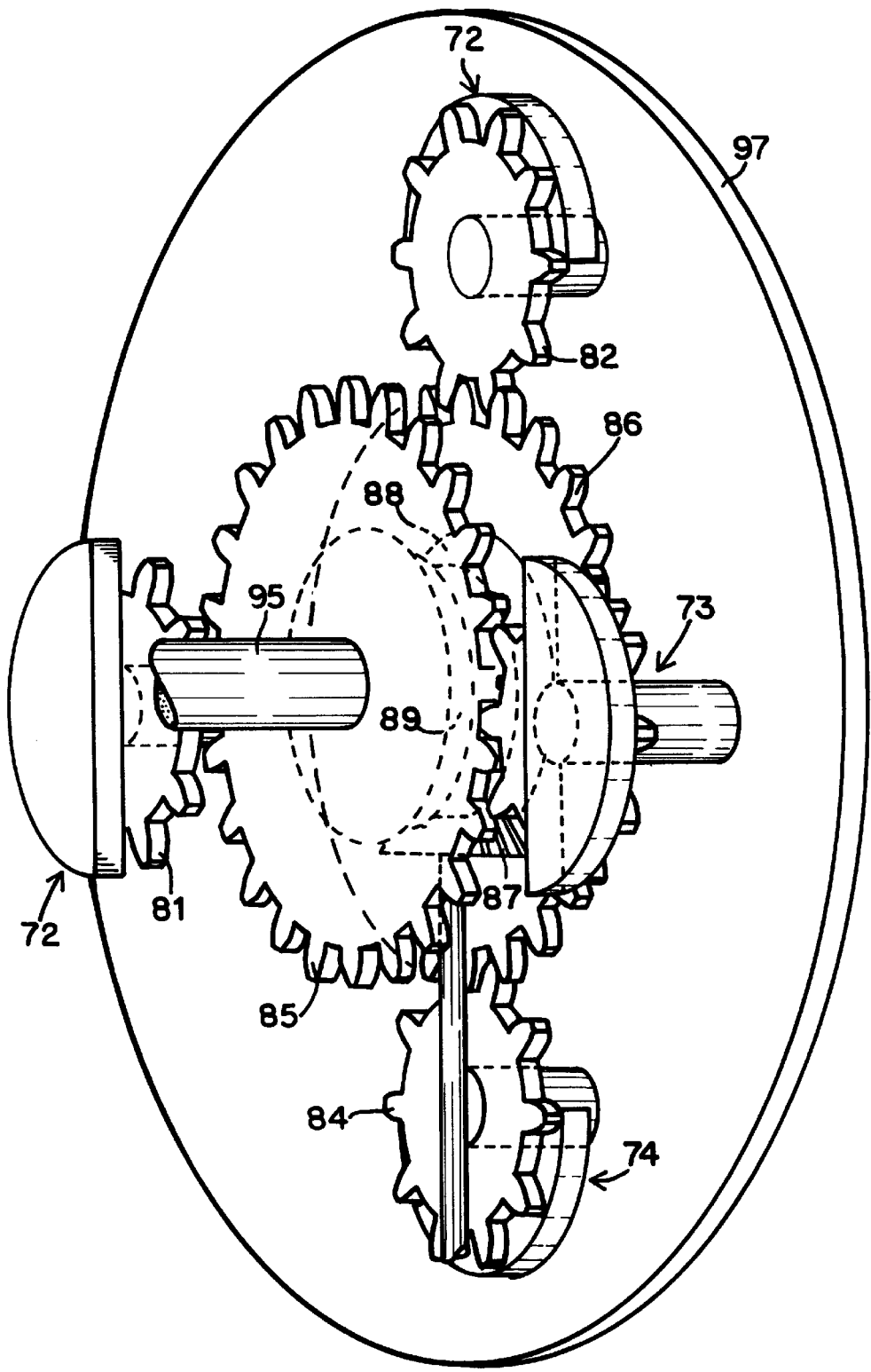
FIG. 3 shows a configuration in which four masses are driven by coaxial drive gears.

FIG. 3 shows a configuration for driving rotating kinetic elements 71–74 by gears 81–89. The rotating kinetic elements include driven gears 81–84, and a drive shaft 95 driving a pair of drive gears 85, 86. The drive shaft 95 drives the drive gears 85, 86 in opposite directions of rotation. The drive gears 85, 86 respectively drive the driven gears 81–84, thereby causing the respective rotating kinetic elements 71–74 to rotate. The output of this configuration is similar to that of FIGS. 1–2, but the chain drive is eliminated. Since four kinetic elements 71–74 are used, the sum of centrifugal forces would be that of the four kinetic elements 71–74 about a center axis of the drive shaft 95. Pairs of the kinetic elements, 71, 73 and 72, 74 would counterbalance each other in directions passing through the center axis which is coaxial with drive shaft 95. By providing sets of oppositely rotating coaxially aligned elements 71, 73 and 72, 74, an imbalance of radial force across the center axis 95 of the rocker plate 97 is reduced or eliminated. This eliminates the need for the retention spring 51 described in connection with the embodiment of FIG. 1 and 2.

The kinetic elements 71–74 are axially mounted to a rocker plate 97, which provides an oscillating mechanical output in response to the sum of kinetic forces about the center axis. This is in turn resolved into a unidirectional output force, for example, by one-way clutches such as one-way clutches 31, 32 shown in FIG. 2.

While pairs of kinetic elements, such as pair 71, 73 and pair 72, 74, are shown, it is possible to arrange an odd number of kinetic elements, provided that the kinetic elements balance each other across a center of output rotation of the group of kinetic elements. Ideally, the centrifugal force of the kinetic elements should be cumulative in a direction of torque about the center of output rotation.

Figure 4:
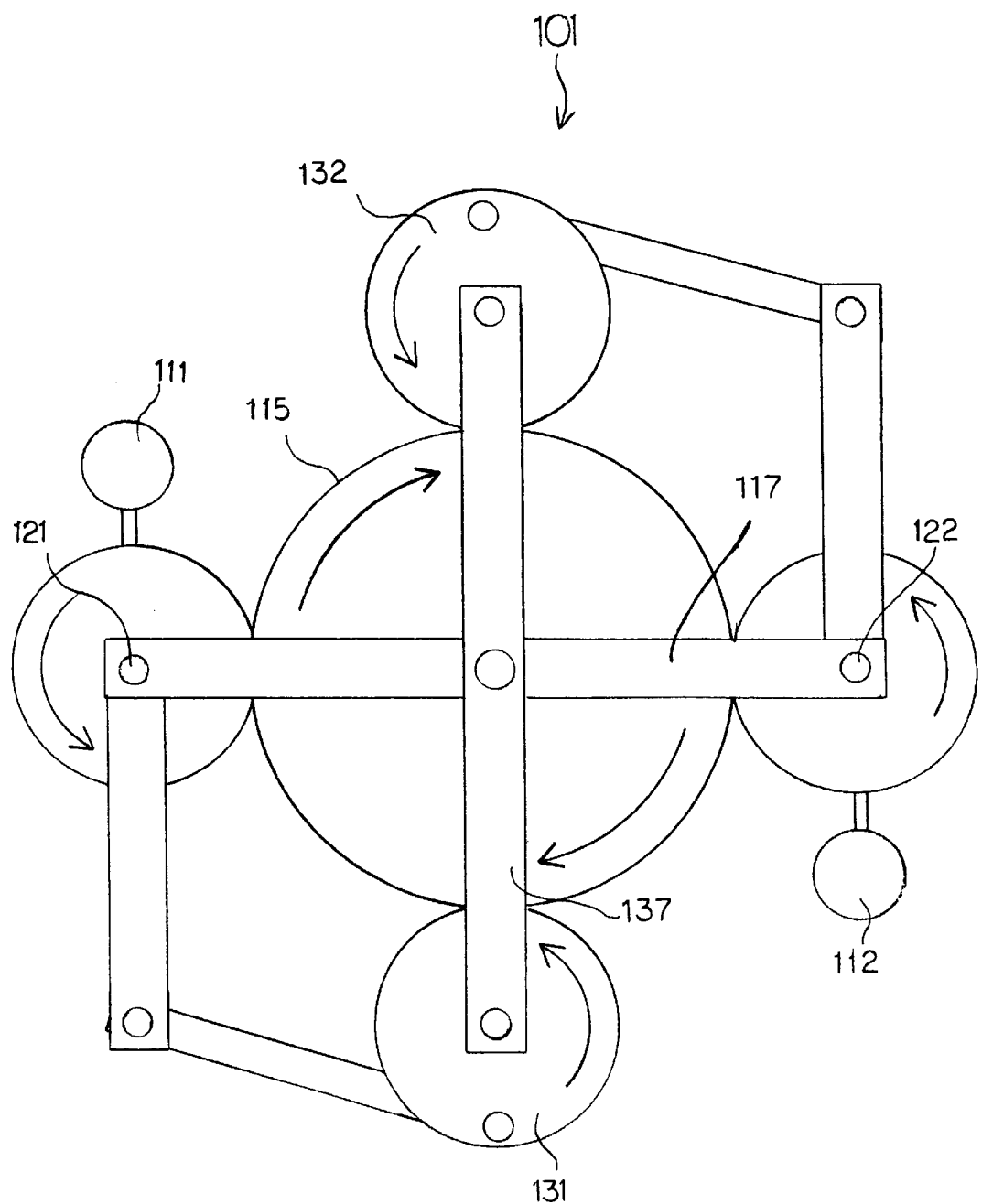
FIG. 4 shows an arrangement in which a synchronous crank arrangement provides a unidirectional force output.

Referring to FIG. 4, it is believed that a synchronous crank arrangement 101 may be used to provide a unidirectional force output. A plurality of kinetic elements 111, 112 are driven by a drive gear 115. A rocker arm 117 maintains a constant phase relationship between center axes 121, 122 of the kinetic elements 111, 112. The kinetic elements 111, 112, in turn are crank connected to a pair of crank driven gears 131, 132. According to this configuration, the crank driven gears 131, 132, in turn are maintained in a constant phase relationship by a connecting arm 137.

In operation, the rotation of the drive gear 115 drives the kinetic elements 111, 112. The interconnection of the kinetic elements 111, 112 to the crank driven gears 131, 132 causes the connecting arm 137 to rotate, providing a power output. The rocker arm 117 and kinetic elements 111, 112 follow the crank driven gears 131, 132, so that the arrangement would be able to continue to rotate. The motion of the crank driven gears 131, 132 is dependent on the motion of the kinetic elements 111, 112. The arrangement of the gears and cranks is therefore believed to provide a synchronous crank arrangement.

Figure 5:
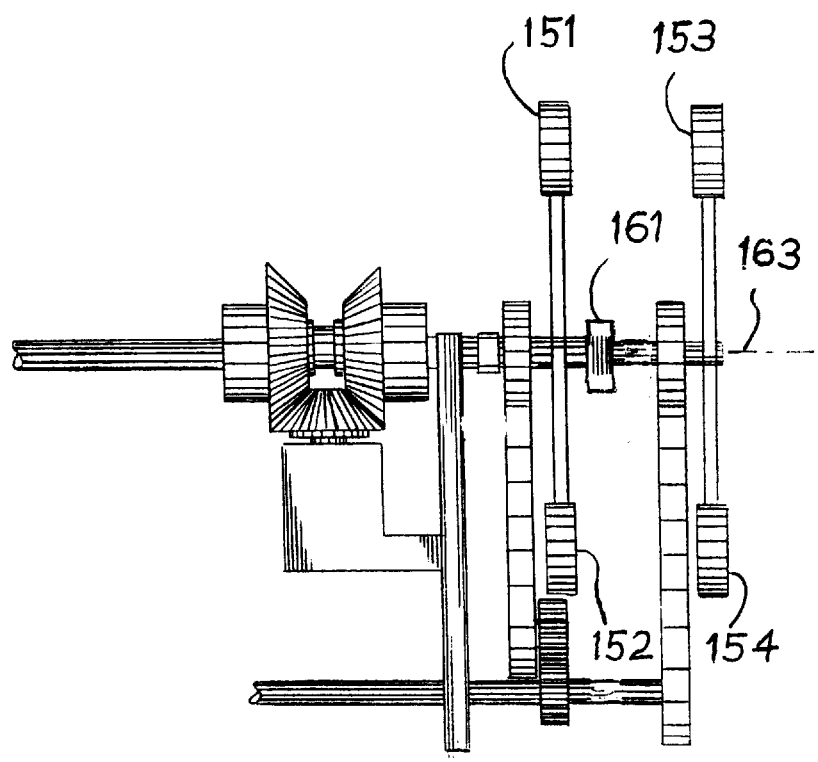
FIG. 5 shows an arrangement in which two pairs of kinetic elements are coaxially aligned.

FIG. 5 shows an arrangement in which a first pair of kinetic elements 151, 152 are coaxially aligned with respective ones of a second pair of kinetic elements 153, 154. The kinetic elements 151–154 are mounted so as to drive a rocker arm 161 about a center axis 163 of the rocker arm 161.

The coaxially aligned elements 151, 153 and 152, 154 are driven in opposite directions in a manner such that the rotation of the coaxially aligned kinetic elements 151, 153 and 152, 154 results in a sum of the centrifugal forces along a pivoting line of motion (not shown). The pivoting line of motion is described above with reference to FIGS. 1 and 2, which describes pivoting line of motion 41. Also as described above, the out of phase arrangement of each pair of the kinetic elements 151, 152 and 153, 154 shown in FIG. 5 is such that the centrifugal force normal to a radius from the center axis 163 of the rocker arm 161 is additive. In addition, the out of phase arrangement of each set of coaxially aligned elements 151, 153 and 152, 154 is such that the centrifugal force normal to a radius from the center axis 163 of the rocker arm 161 is also additive.

The movement of the rocker arm 161 and consequently of the kinetic elements is such that a kinetic element rotating in an arc between the center axis 163 and a rotating axis of that kinetic element 151–154 would have a different velocity than that of a kinetic element rotating in an arc further from the center axis 163. By providing sets of oppositely rotating coaxially aligned elements 151, 152 and 153, 154, an imbalance of radial force across the center axis 163 of the rocker arm is reduced or eliminated.

While two pairs of kinetic elements 151, 152 and 153, 154 are shown, it is possible to coaxially arrange more than two kinetic elements. It is likewise possible to arrange sets of kinetic elements which rotate in opposite directions but are not coaxially aligned.

It is possible to arrange the kinetic elements 151, 152 and 153, 154 so that are not coaxial, but nearly so. In this manner, the coaxial elements remain substantially coaxial.

Figure 6:
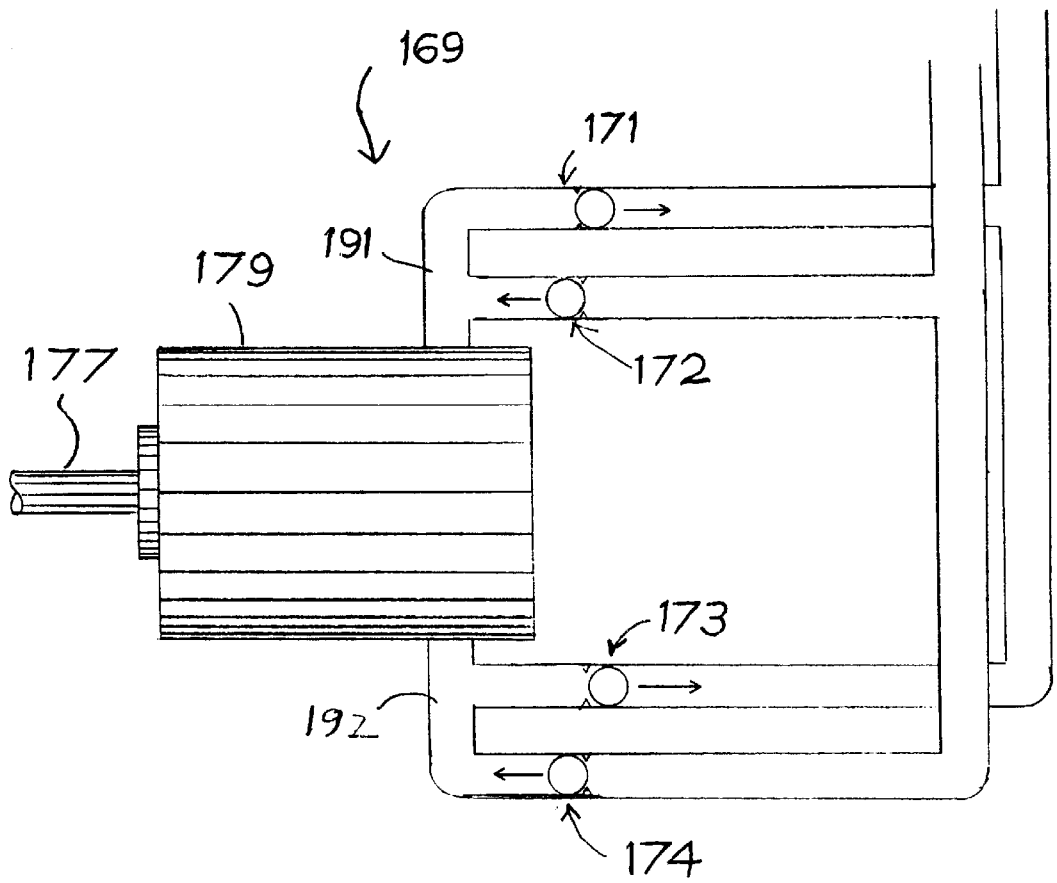
FIG. 6 shows a configuration in which energy from rotating masses is transferred to a hydraulic pump.

FIG. 6 shows an arrangement in which the output is a hydraulic pump 169, with rectification of the pump output accomplished by fluid check valves 171–174 instead of one-way clutches. As is the case with the embodiments of FIGS. 1–4, plurality of eccentric rotating kinetic elements are axially connected to a rocker arm (not shown). The rocker arm is connected by an output shaft 177 to the a double acting hydraulic pump unit 179. The double acting hydraulic pump unit 179 has a pair of cylinders or other compression chambers (not shown) which drive fluid in response to pivoting of the rocker arm. The connection of the double acting hydraulic pump unit 179 is such that pivoting of the rocker arm output shaft 177 in one direction drives fluid from one output 191, whereas pivoting in the opposite direction drives fluid from the other output 192. Check valves 171–174 rectify the flow of the fluid. In this manner, the rocker arm output shaft 177 operates the double acting hydraulic pump unit 179, with the check valves 171–174 directing fluid in one direction despite pump drive reciprocation. Any suitable hydraulic pump could be subsisted for double acting hydraulic pump unit 179 with appropriate check valves to rectify the fluid flow.

As is the case with the transmissions with the mechanical rotary motion output (FIGS. 1–4), the torque on the rocker arm, which drives the pump 169, is able to provide a force at idle which is equal to the above formula of:

$$\tau = M * r * \omega^2 * \text{SIN}(\alpha) * R * n$$

The result of this is a variable displacement hydraulic pump (pump 169). Coupled with a hydraulic motor, the pump 169 results in a constantly variable hydrostatic transmission. Since multiple hydraulic motors can be connected to the output of the pump 169, it is possible to eliminate differential and transfer case gearing on vehicles. It is also possible to synchronize the outputs of the hydraulic motors and to selectively provide power from multiple hydraulic pumps.

The prime mover is able to idle with reduced load, also as described above in connection with FIGS. 1–4. This is particularly advantageous in the case of electric motor driven pumps which must be restarted when the output pressure is substantial. Examples of such pumps are liquid cycle air conditioners and water pumps used to maintain a continuous pressure head. Since the motor is able to start with a reduced load, the requirement to accommodate high load startup is reduced, and the motor is able to start operation against output fluid pressure which is already high. It is also possible to allow the motor to idle against a full load fluid output pressure while keeping power demand low.

Figure 8:
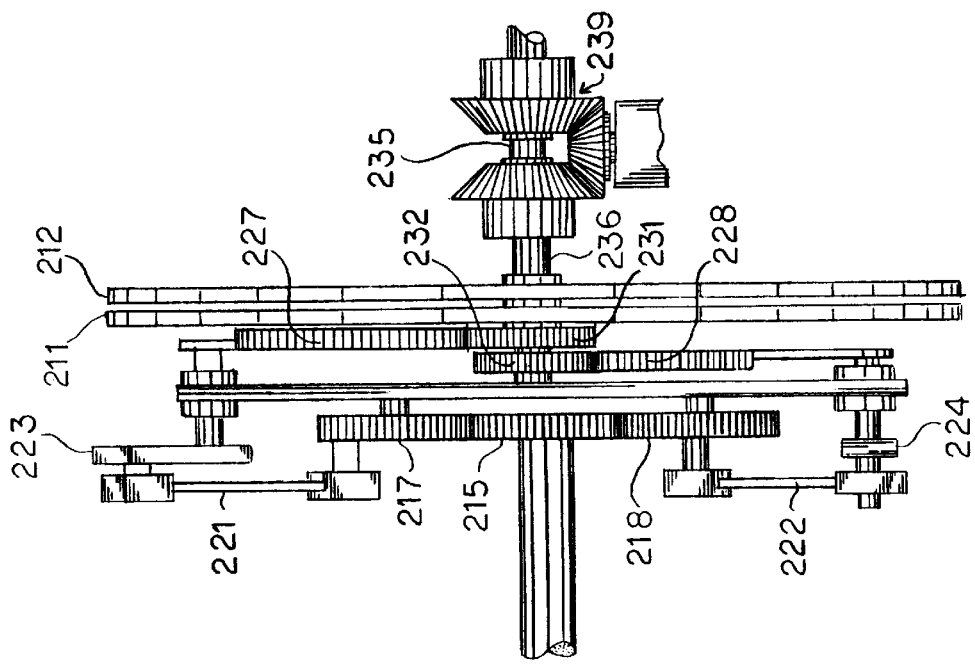
FIGS. 7 and 8 show an arrangement in which kinetic energy is transferred to two reciprocally oscillating flywheels.
Figure 7:
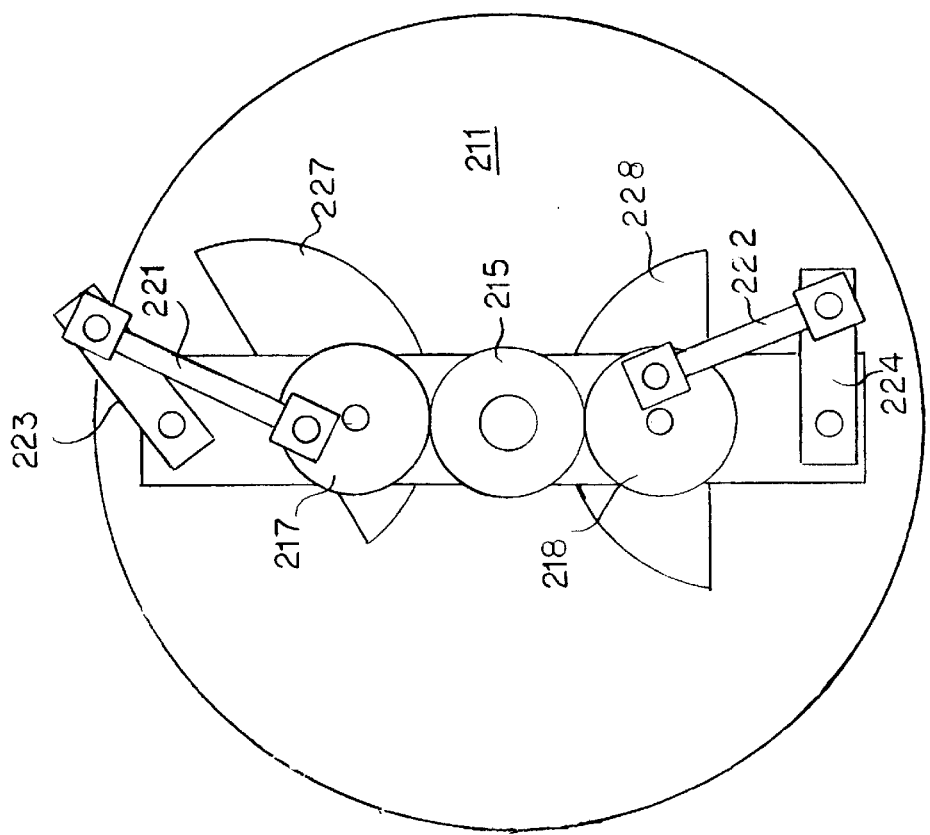

FIGS. 7 and 8 show an arrangement in which flywheels 211, 212 are used as kinetic elements. The flywheels 211, 212 are reciprocally driven by an input shaft gear 215, crank gears 217, 218, and connecting rods 221–224 to drive a pair of reciprocating gears 227, 228. The reciprocating gears 227, 228 drive driven gears 231, 232 on respective coaxial intermediate shafts 235, 236, which are fixed to respective ones of the flywheels 211, 212. The flywheels 211, 212 are thereby caused to counterrotate and drive an output mechanism 239. The flywheels 211, 212 are driven out of phase with each other, so as to dynamically balance each other. Preferably, as flywheel 211 is accelerating, flywheel 212 is decelerating and when flywheel 212 is accelerating, flywheel 211 is decelerating. The output mechanism 239 provides a unidirectional force output.

It is also possible to use a differential gear to convert the bidirectional force and motion of kinetic elements (such as kinetic elements 15, 16) to unidirectional motion. A differential gear (not shown) is provided to transfer power between a prime mover such as a motor, a power transmission and a power output. The differential gear is of the type commonly found on an automobile. The differential gear permits relative rotation of two shafts, known as differential driven shafts, and a third, known as a differential drive shaft. The differential drive shaft rotates a cage carrying planetary bevel wheels meshing with two bevel wheels on the differential driven shafts. The differential driven shafts are independent, but the sum of the rotation rates of the differential driven shafts remains the same in proportion to the rotation rate of the differential drive shaft. This proportion is the differential ratio.

The motor is connected to a first driven shaft and so the first driven shaft is in fact a power input for the differential gear. The differential drive shaft is connected to a crank arrangement, which in turn, synchronously drives the rocker arm. The rocker arm is thereby connected to the drive shaft of the differential gear through the synchronous crank arrangement, causing the rocker arm and crank arrangement to move synchronously. The power output is the second differential driven shaft. This would avoid the requirement that one-way clutches engage repeatedly at an operating speed of oscillation of the rocker arm. The use of cranks to transmit force from a reciprocating input to a unidirectional output requires only that a start-up motion occur.

Functionally, the invention provides a continuously variable power transmission which first converts input power at input drive shaft 13, drive shaft 95 or input shaft gear 215, to kinetic energy at the kinetic elements 15–16, 71–74, 111–112, 151–154 or 211–212. The transmission then converts the reaction force to a unidirectional output at an output 35, or the output of pump 169 or output mechanism 239. An input drive mechanism such as chain drive 19 receives the input power and reciprocally drives the kinetic elements 15–16, 71–74, 111–112, 151–154 or 211–212, which are rotating masses. The reciprocation of the kinetic elements is then transferred to a reciprocating output drive, such as one-way clutches 31, 32 or fluid check valves 171–174. A force translation mechanism, such as the clutches 31, 32 is connected to a reciprocating output drive, such as rocker arm 21, rocker plate 97, double acting hydraulic pump unit 179, or coaxial intermediate shafts 235, 236. The reaction force is then converted to a unidirectional force output. Thus, a reciprocal drive mechanism is driven by an input power drive mechanism and reaction force is rectified to provide a unidirectional force output by a force rectification mechanism.

What is claimed is:

1. A power transmission for receiving a rotary power input, and providing a power output, the transmission comprising:
   a) a lever;
   b) a plurality of at least two masses rotatably mounted to the lever, the masses having mass centers which are eccentric to rotation axes of the masses;
   c) a mechanism to rotatably drive the masses about said rotation axes;
   d) in addition to said plurality of masses, a set of counterrotating masses, mounted to the lever with center axes substantially coaxial with center axes of respective ones of said plurality of masses, the mechanism to rotatable drive the masses causing the counterrotating masses to rotate in a direction opposite said first plurality of masses; and
   e) a force translation mechanism connected to the lever, whereby the mechanism to rotatably drive the masses results in the masses exerting kinetic force on the lever, the lever in turn transfers the kinetic force to the force translation mechanism and the force translation mechanism provides a force output.

2. The power transmission of claim wherein the force exerted on the lever is bidirectional and the force translation mechanism converts force to a unidirectional force at the output.

3. The power transmission of claim 1, wherein
   a) the force exerted on the lever is bidirectional;
   b) the force translation mechanism includes a plurality of one-way clutches, each of which transfers force in a single direction.

4. The power transmission of claim 1, wherein
   a) the force exerted on the lever is bidirectional;
   b) the force translation mechanism includes a gear arrangement, the gear arrangement providing a force output in a single direction.

5. The power transmission of claim 1 wherein:
   a) an input power drive mechanism receives the power input; and
   b) the input power drive mechanism includes a gear drive extending to the rotating mass.

6. The power transmission of claim 1, wherein the input power is converted to the kinetic energy in the form of accelerating mass, and the accelerating mass comprises rotatable eccentric masses mounted to a rocker arm so that said reaction force exerts an oscillating force on the rocker arm, said oscillating force rectified in order to convert the oscillating force to the unidirectional force output.

7. The power transmission of claim 1, wherein
   a) the force exerted on the lever is bidirectional; and
   b) the force translation mechanism is a fluid pump which provides an output in the form of hydraulic fluid under pressure.

8. The power transmission of claim 1, wherein
a) the force exerted on the lever is bidirectional;
b) the force translation mechanism is a fluid pump; and
c) a plurality of check valves converts force to a unidirectional force at the output.

9. The power transmission of claim 1, wherein a) the force exerted on the lever is bidirectional;
b) the force translation mechanism includes a synchronous crank, wherein the synchronous crank transfers force in a single direction.

* * * * *